United States Patent Office 3,342,836
Patented Sept. 19, 1967

3,342,836
2-(ALKOXYALKYL)AMINO-2-(2-THIENYL) CYCLOHEXANONE COMPOUNDS
Yvon J. L'Italien, Plymouth, Mich., assignor to Parke, Davis & Company, Detroit, Mich., a corporation of Michigan
No Drawing. Filed July 30, 1965, Ser. No. 476,151
7 Claims. (Cl. 260—332.3)

ABSTRACT OF THE DISCLOSURE 2-(alkoxyalkyl)amino - 2 - (2 - thienyl)cyclohexanones and acid-addition salts. The compounds have pharmacological activity and can be produced by (a) heating a 1-hydroxycyclopentyl 2-thienyl N-(alkoxyalkyl)ketimine with or without a solvent to cause a thermal rearrangement or (b) reacting 2-amino-2-(2-thienyl)cyclohexanone with an alkoxyalkyl halide.

---

The present invention relates to new thiophene compounds. More particularly, the invention relates to new thiophene compounds which in free base form can be represented by the formula

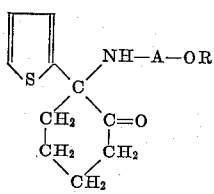

to acid-addition salts thereof and to methods for the production of the foregoing compounds. In this formula A represents a lower alkylene radical separating the groups to which it is attached by at least 2 carbon atoms; R represents a lower alkyl radical; and A and R contain together a total of fewer than 6 carbon atoms. Thus the group, —A—OR, represents an alkoxyalkyl radical of fewer than 6 carbon atoms such as methoxyethyl, ethoxyethyl, methoxypropyl, ethoxypropyl, or propoxyethyl.

In accordance with the invention, the foregoing compounds can be produced by heating a ketimine compound of the formula

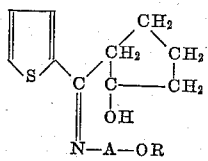

or an acid-addition salt thereof, where A and R are as defined before. This process is a thermal rearrangement reaction. It can be carried out, if desired, in the absence of a solvent, but it is preferable to employ a solvent. Some examples of satisfactory solvents are high boiling hydrocarbons such as hexacosane and biphenyl; high boiling ethers such as diphenyl ether and pentyl phenyl ether; high boiling neutral petroleum fractions; mineral oils; and mixtures thereof. A preferred solvent is the eutectic mixture containing 73.5% of diphenyl ether and 26.5% of biphenyl. The process is carried out by heating at a temperature of about 175–275° C. or optionally somewhat higher, for 1 to 15 minutes. The preferred reaction conditions are about 200–250° C. for 5 to 10 minutes, the higher temperatures being used for rearrangement of the free base and the lower temperatures being used for rearrangement of an acid-addition salt. In general, use of the starting material in free base form is preferred in this process. The product is isolated either as the free base or as an acid-addition salt by adjustment of the pH as required.

The ketimines employed as starting materials in the foregoing process can be prepared by a variety of methods. For example, 2-thienylmagnesium bromide or 2-thienyllithium is reacted under anhydrous conditions with the tetrahydro-2-pyranyl ether of cyclopentanone cyanohydrin and the product treated with water to give the tetrahydro-2-pyranyl ether of 1-hydroxycyclopentyl 2-thienyl ketimine. The tetrahydro-2-pyranyl ether of 1-hydroxycyclopentyl 2-thienyl ketimine is hydrolyzed by heating with aqueous mineral acid to give 1-hydroxycyclopentyl 2-thienyl ketone. The latter compound is converted to the desired ketimine by reaction with a lower alkoxyalkylamine. These procedures are illustrated in greater detail below.

Also in accordance with the invention, the compounds of the invention can be produced by reacting 2-amino-2-(2-thienyl)cyclohexanone having in free base form the formula

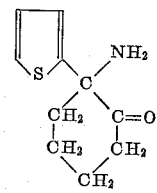

with a compound of the formula

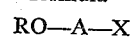

RO—A—X where A and R are as defined before and X represents halogen, preferably bromine. The reaction is normally carried out in the presence of a base such as an alkali metal carbonate or bicarbonate, an alkaline earth metal carbonate, oxide or hydroxide, or an organic tertiary amine. At least approximately one equivalent and preferably up to a moderate excess of the alkoxyalkyl halide is used. Some suitable solvents for the reaction are lower aliphatic ketones such as acetone, methyl ethyl ketone, and diethyl ketone; lower alkanols such as methanol, ethanol, and isopropyl alcohol; and other relatively unreactive solvents such as tetrahydrofuran, dioxane, acetonitrile, and dimethylformamide. Examples of preferred solvents are acetone and acetonitrile. The time and temperature required for the reaction vary somewhat with the alkoxyalkyl halide and solvent used, but in general the reaction is substantially complete when carried out at a temperature of from 15 to 125° C. for from 1 to 72 hours, the longer reaction times being used with the lower temperatures. Preferred reaction conditions are 55–85° C. for 12 to 24 hours. The reaction product is isolated directly as the free base, or following acidification, as an acid-addition salt.

The 2-amino-2-(2-thienyl)cyclohexanone employed as starting material in the foregoing process can be prepared by a variety of methods. For example, the tetrahydro-2-pyranyl ether of 1-hydroxycyclopentyl 2-thienyl ketimine is reacted with anhydrous hydrogen chloride followed by basification to give 1-hydroxycyclopentyl 2-thienyl ketimine. The latter compound is converted by thermal rearrangement to 2-amino-2-(2-thienyl)cyclohexanone.

The free bases of the invention form acid-addition salts with a variety of inorganic and organic acids. Pharmaceutically-acceptable acid-addition salts are formed by reaction with such acids as hydrochloric, hydrobromic, sulfuric, phosphoric, acetic, succinic, citric, maleic, and pamoic acids. The acid-addition salts are converted to the free bases by reaction with a base such as sodium hydroxide, potassium carbonate, or potassium bicarbonate. The free bases and their acid-addition salts differ in solubility properties but in general are otherwise equivalent for the purposes of the invention.

The compounds of the invention are useful as pharmacological agents and as chemical intermediates. When used as pharmacological agents they produce a depressant effect on the central nervous system. They are anesthetic agents capable of producing general anesthesia and in addition are anticonvulsant agents. Their activity as anticonvulsant agents can be measured by determining their ability to prevent the occurrence of convulsions following electroshock. A preferred anticonvulsant compound of the invention is 2-(3-methoxypropyl)amino-2-(2-thienyl)cyclohexanone. As anesthetic agents the compounds of the invention exhibit relatively low potency with short to medium duration of action and thus are most suitable in applications where more potent anesthetic activity is not desired. When compared with anesthetic agents having somewhat related chemical structures the compounds of the invention show a relatively low ratio of potency to duration of action. The compounds are active on both oral and parenteral administration.

The invention is illustrated by the following examples.

EXAMPLE 1

A solution of 20 g. of 1-hydroxycyclopentyl 2-thienyl N-(2-ethoxyethyl)ketimine in 200 ml. of a mixture of 73.5% diphenyl ether and 26.5% biphenyl is heated at 250° C. for 5 minutes. The mixture is cooled to room temperature and stirred with 200 ml. of ether and 200 ml. of 0.5 N hydrochloric acid. The aqueous phase is separated, made basic with 20% aqueous sodium hydroxide and extracted with ether. The ether extract is dried, filtered and evaporated to give a residue of 2-(2-ethoxyethyl)amino-2-(2-thienyl)cyclohexanone. The hydrochloride is obtained by dissolving the free base in ether and treating the solution with dry hydrogen chloride until precipitation of the product is complete; following crystallization from isopropyl alcohol-ether, the hydrochloride has M.P. 160–161° C. The hydrobromide and sulfate are obtained by treating the free base with dry hydrogen bromide or with sulfuric acid. A salt with citric acid is obtained by mixing methanolic solutions of the free base and citric acid and concentrating the mixture.

By the foregoing general procedure the following additional products are obtained.

From 1-hydroxycyclopentyl 2-thienyl N-(3-methoxypropyl)ketimine, the product is 2-(3-methoxypropyl)amino-2-(2-thienyl)cyclohexanone. The hydrochloride has M.P. 155–156° C.

EXAMPLE 2

A mixture of 19.5 g. of 2-amino-2-(2-thienyl)cyclohexanone, 25.8 g. of 2-ethoxyethyl bromide, 42 g. of potassium carbonate, 0.5 g. of potassium iodide, and 300 ml. of acetonitrile is stirred and heated at reflux for 20 hours. The mixture is cooled, diluted with a large volume of ether, and filtered to remove inorganic salts. The filtrate is washed with water and extracted with a slight excess of dilute hydrochloric acid. The acid extract is treated with charcoal, filtered, made basic with aqueous sodium hydroxide, and the basified mixture is extracted with ether. The ether extract is dried and treated with slight excess of dry hydrogen chloride. The insoluble precipitate of 2-(2-ethoxyethyl)-amino-2-(2-thienyl)cyclohexanone hydrochloride is collected; M.P. 160–161° C. following crystallization from isopropyl alcohol-ether. The free base is obtained by dissolving the hydrochloride in water, adding potassium carbonate, and extracting with ether. A salt with citric acid is obtained by mixing methanolic solutions of free base and citric acid and concentrating the mixture.

*Starting materials*

A solution of 48.8 g. of the tetrahydro-2-pyranyl ether of cyclopentanone cyanohydrin in 200 ml. of ether is added to a solution of 2-thienylmagnesium bromide prepared from 52.1 g. of 2-bromothiophene and 7.8 g. of magnesium in 250 ml. of ether. The mixture is heated at reflux for 16 hours, then chilled, and hydrolyzed by stirring with 200 ml. of 1:1 hydrochloric acid-water. The aqueous phase is separated, heated at 90–100° C. for 3 hours, cooled, and extracted with ether. The ether extract is dried and evaporated to give a residue of 1-hydroxycyclopentyl 2-thienyl ketone as an oil; B.P. 116–118° C. at 0.25 mm.

A solution of 19.6 g. of 1-hydroxycyclopentyl 2-thienyl ketone and 13.5 g. of 2-ethoxyethylamine in 200 ml. of benzene is heated at the boiling point with continuous removal of the water formed in the reaction until the theoretical amount of water has been collected. Approximately 5 days is required. The benzene solution is evaporated to give a residue of 1-hydroxycyclopentyl 2-thienyl N-(2-ethoxyethyl)ketimine as an oil; B.P. 125–127° C. at 0.25 mm. The product has prominent infrared absorption maxima at 1640 and 1660 reciprocal centimeters. By the substitution of 3-methoxypropylamine for the 2-ethoxyethylamine in the foregoing procedure, the product obtained is 1-hydroxycyclopentyl 2-thienyl N-(3-methoxypropyl)ketimine; infrared adsorption maxima at 1645 and 1656 reciprocal centimeters.

A solution of 2-thienyllithium is prepared by adding 126 g. of thiophene to a solution of 90 g. of butyllithium in 440 ml. of heptane and 700 ml. of ether and stirring the mixture for 15 minutes. There is then added dropwise 195 g. of the tetrahydro-2-pyranyl ether of cyclopentanone cyanohydrin and the mixture is stirred for 3 hours. The mixture is then stirred with 350 ml. of water and the organic phase separated, dried, and evaporated to give a residue of the tetrahydro-2-pyranyl ether of 1-hydroxycyclopentyl 2-thienyl ketimine; B.P. 137–142° C. at 0.1 mm.

An excess of hydrogen chloride is passed into a solution of 195 g. of the tetrahydro-2-pyranyl ether of 1-hydroxycyclopentyl 2-thienyl ketimine in 400 ml. of isopropyl alcohol. The solution is diluted with ether until precipitation of the product, 1-hydroxycyclopentyl 2-thienyl ketimine hydrochloride, is complete. This product, M.P. 163–167° C., is collected and dissolved in methanol containing one equivalent of sodium methoxide. The resulting mixture is treated with charcoal and filtered and the filtrate is evaporated to dryness as reduced pressure. The residue is dissolved in ether and the ether solution is washed with dilute aqueous sodium hydroxide, then with water, dried, and evaporated to give a residue of 1-hydroxycyclopentyl 2-thienyl ketimine.

A solution of 18 g. of 1-hydroxycyclopentyl 2-thienyl ketimine in 200 ml. of a mixture of 73.5% diphenyl ether and 26.5% biphenyl is heated at 250° C. for 5 minutes. The mixture is cooled to room temperature and stirred with 200 ml. of ether and 200 ml. of 0.5 N hydrochloric acid. The aqueous phase is separated, made basic with 20% aqueous sodium hydroxide and extracted with ether. The ether extract is dried, filtered, and evaporated to give a residue of 2-amino-2-(2-thienyl)cyclohexanone; B.P. 116–118° C. at 0.4 mm. The hydrochloride has M.P. 218–219° C.

I claim:
1. A member of the class consisting of compounds of the formula

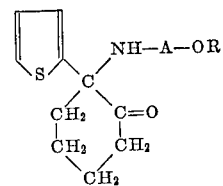

and pharmaceutically-acceptable acid-addition salts thereof; where A is a lower alkylene separating the groups to which it is attached by at least 2 carbon atoms; R is lower alkyl; and A and R contain together a total of fewer than 6 carbon atoms.

2. A pharmaceutically-acceptable acid-addition salt of 2-(2-ethoxyethyl)amino-2-(2-thienyl)cyclohexanone.

3. 2-(2-ethoxyethyl)amino-2-(2-thienyl)cyclohexanone hydrochloride.

4. 2-(2-ethoxyethyl)amino-2-(2-thienyl)cyclohexanone.

5. A pharmaceutically-acceptable acid-addition salt of 2-(3-methoxypropyl)amino-2-(2-thienyl)cyclohexanone.

6. 2-(3-methoxypropyl)amino-2-(2-thienyl)cyclohexanone hydrochloride.

7. 2-(3-methoxypropyl)amino-2-(2-thienyl)cyclohexanone.

References Cited

Migrdichian: Organic Synthesis (1957), page 465.
Fieser: Advanced Organic Chemistry (1961), page 493.
Stevens: Journal of the Am. Chem. Soc. (1963), 85: 1464–70.
Stevens: Chemical Abstracts (1964), 61: 5569–70.

WALTER A. MODANCE, *Primary Examiner.*

C. SHURKO, *Assistant Examiner.*